May 20, 1947.  H. C. FRENTZEL, JR., ET AL  2,420,875
HEATING APPARATUS
Filed Oct. 9, 1942   3 Sheets-Sheet 1

INVENTORS
Herman C. Frentzel Jr.
Edward O. Ersath
BY Morsell & Morsell
ATTORNEYS.

Patented May 20, 1947

2,420,875

UNITED STATES PATENT OFFICE 2,420,875

HEATING APPARATUS

Herman C. Frentzel, Jr., and Edward O. Errath, Milwaukee, Wis., assignors to The Heil Co., Milwaukee, Wis., a corporation of Wisconsin Application October 9, 1942, Serial No. 461,486

9 Claims. (Cl. 126—110)

This invention relates to improvements in heating apparatus.

Heretofore various attempts have been made to provide a combination heating unit which will furnish both heat and domestic hot water in winter and domestic hot water alone in summer. Some of these devices have been successful where they are applied to a hot water or steam heating system, because it is a relatively simple problem to prevent the flow of hot water or steam to the radiators of a house when the system is being used in summer for heating a domestic hot water coil only. While the prior art discloses that some attempts have also been made to apply a similar idea to hot air furnaces, none of these devices, so far as is known, have enjoyed any degree of commercial success. Some of the devices of the prior art are so constructed that escape of heat to the rooms takes place when the apparatus is being operated in the summer to heat domestic water; other devices of the prior art would quite obviously result in overheating of the domestic water in the winter; still other devices of the prior art are arranged so that the cost of furnishing domestic hot water in the summer is so excessive as to be impractical; and in others the heating of the domestic hot water in the summer would be entirely too slow and inefficient.

It is a general object of the present invention to provide heating apparatus of the hot air type which is so constructed as to efficiently furnish, at low cost, heat both for the rooms and for domestic hot water in the winter, and to furnish heat for domestic hot water only in the summer. The latter function is carried out in the summer without permitting any heat to escape to the ducts leading to the rooms, and may be similarly carried out in the winter if the rooms are at such a temperature that there is no call for additional heat. On the other hand, if the rooms require heat, then the domestic water is heated simultaneously. Thus water for household uses may be heated economically whenever the heating plant is in operation to supply heat to the rooms, but when room heat is not required there is no wasteful and undesired delivery of heat thereto merely because of a requirement for additional heat in the domestic water storage tank. The prevention of escape of heat to the rooms, when room heating is not desired, and while the domestic water is being heated, is accomplished by a novel construction and arrangement of elements which places the air distribution system in balance, allowing air in the heating ducts to by-pass the furnace and circulate by gravity. The arrangement is also such that any siphon effect, such as might result in pulling hot air from the furnace into the air distribution ducts, is broken.

A more specific object of the invention is to provide hot air heating apparatus including delivery ducts leading to the rooms and return ducts wherein a single valve having two positions is utilized in combination with a novel arrangement for the air delivery passageway adjacent the furnace. One position of the valve serves to positively shut off communication between the heating plant and the duct leading to the rooms and to simultaneously open a by-pass whereby air from the return duct may enter the delivery duct without passing through the heating plant. The other position of the valve shuts off the by-pass and simultaneously opens communication between the heating plant and delivery duct to compel the air from the return duct to pass through the heating apparatus.

A further specific object of the invention is to provide a construction as above described wherein there is a blower which when in operation automatically moves the valve to a position to close the by-pass, the valve being automatically returned to the opposite position whenever the blower is shut off.

A further object of the invention is to provide a construction as above described including parallel hot air delivery passageways adjacent the furnace wherein communication between ends of said passageways is controlled by a valve so shaped as to provide for a curved return bend when the valve is open. This arrangement reduces frictional losses when the moving air changes its direction of flow.

A further object of the invention is to provide improved hot air heating apparatus operable either with or without a domestic water heating unit wherein there is means in the upper portion of the combustion chamber for lengthening the flue gas travel and for increasing combustion efficiency by causing a better mixture of the products of combustion. This preferably takes the form of a refractory member or dome having communicating concentric passageways through which the rising gases are directed first upwardly, then downwardly, and upwardly again into close juxtaposition to the heating surfaces of the furnace. With this arrangement the furnace height may be reduced without substantial loss of efficiency. Where a domestic water heating unit is being utilized, the refractory dome is arranged to cause the gases to pass into close contact with the water heating element.

A further object of the invention is to provide inexpensive heating apparatus, suitable for small homes, wherein a pot-type oil burner may be effectively employed to efficiently heat the house and domestic hot water.

A still further object of the invention is to provide heating apparatus which may have a novel and inexpensive type of humidifier incorporated therein.

A further object of the invention is to provide a hot air furnace so constructed that different cap units may be selectively installed on the upper end of the furnace to provide various combinations of features such as space heating alone, space heating and domestic water heating, or space heating, domestic water heating, and humidification.

A further object of the invention is to provide a furnace wherein the burner pan may be readily cleaned without removing the same from the furnace.

With the above and other objects in view, the invention consists of the improved heating apparatus, and all its parts and combinations as set forth in the claims, and all equivalents thereof.

In the accompanying drawings, illustrating several embodiments of the invention, wherein the same reference numerals designate the same or corresponding parts in all of the views, Fig. 1 is a vertical longitudinal sectional view through one form of the improved apparatus;

Figure 1:
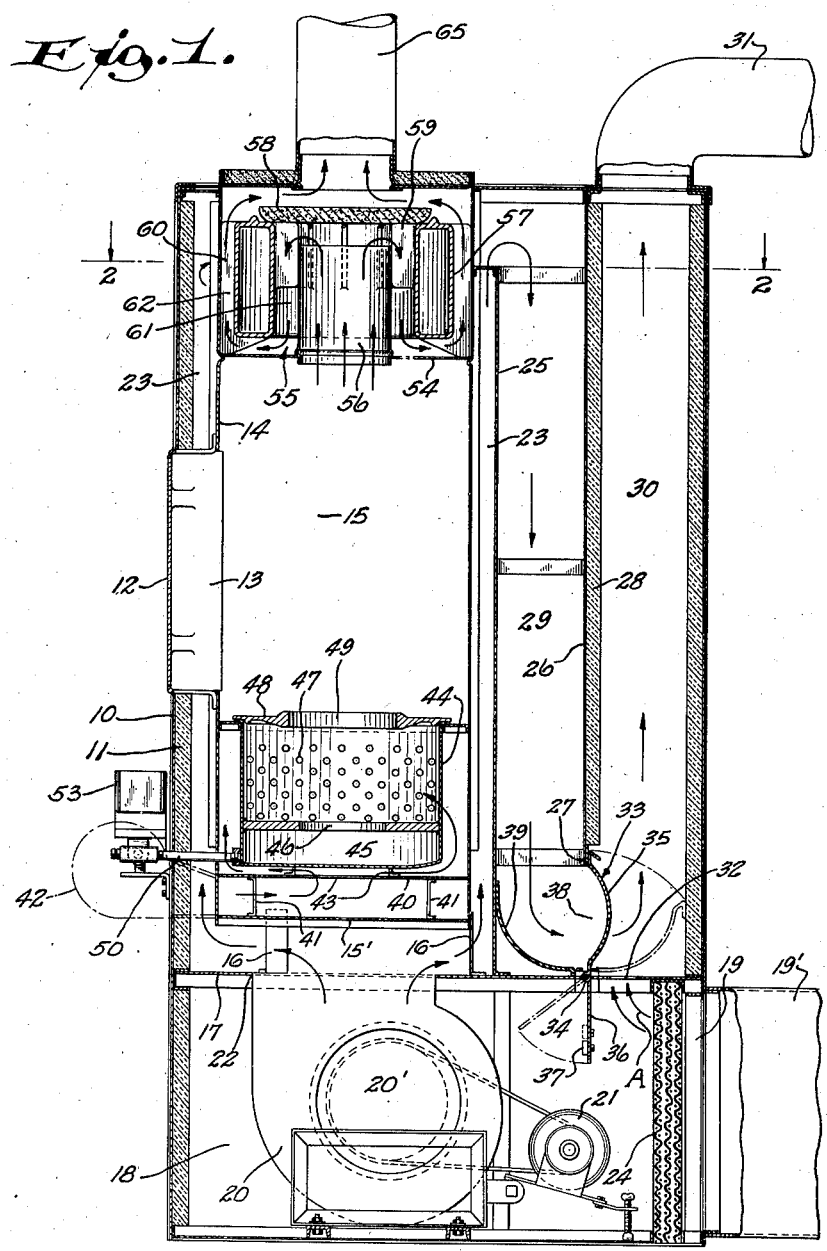
Figure 2:
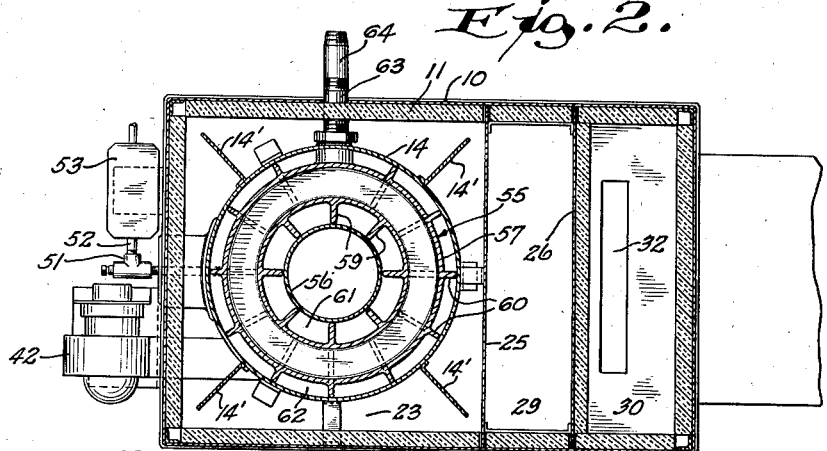
Fig. 2 is a transverse sectional view taken on line 2—2 of Fig. 1.

Referring more particularly to the drawings, first to Fig. 1, the numeral 10 designates an outer casing of suitable material, such as metal, which is insulated as at 11. The casing may be provided with a front door 12, which controls an opening 13 leading to an inner casing 14. The casing 14 forms an enclosure for the combustion chamber 15, and has vertically extending heat radiating fins 14'. As illustrated in Fig. 2, the outer casing 10 is preferably rectangular, and the inner casing 14 is preferably circular in cross-section to occupy only the front portion of the outer casing. The inner casing 14 is provided with a closed bottom 15' having depending supporting legs 16 which are supported on a platform 17. The platform 17 forms the top of a blower chamber or return duct portion 18, and the rear end of the blower chamber has an opening 19 communicating with a return duct 19' from the rooms.

Within the blower chamber is a centrifugal blower 20 of usual construction having a rotary impeller member 20' driven by an electric motor 21. The upper end of the blower housing communicates with an opening 22 leading into the air heating space 23 between the outer cabinet 10 and the inner combustion chamber housing 14.

When the blower is in operation, air from the return duct 19' is drawn into the blower chamber through filtering elements 24. The air then enters an end of the blower housing and is forcibly delivered from the upper end of the blower housing into the space 23 surrounding the combustion chamber cabinet 14.

Referring to Fig. 2, rearwardly of the combustion chamber enclosure 14 is a vertical partition 25 which extends from the shelf 17 to a point short of the top of the cabinet 10, as indicated in Fig. 1. Spaced rearwardly from the partition 25 is another partition 26 which extends from the top of the outer cabinet to the point 27 short of the shelf 17. The partition 26 is preferably insulated, as at 28. Thus there is formed a hot air directing chamber leading from the furnace, which comprises the downwardly extending air outlet channel 29 and an upwardly extending discharge channel 30. The upper end of the channel 30 is connected to the duct 31, which leads to the rooms to be heated.

It is obvious from the above that air forced upwardly through the air heating chamber 23 is heated due to its contact with the wall of the combustion chamber and that when this air reaches the top of the cabinet its flows downwardly through the channel 29 and then upwardly through the channel 30 to the rooms.

At the lower end of the channel 30 the shelf 17 is formed with a by-pass opening 32 through which air from the return duct 19' may by-pass due to the action of gravity, when the blower is not in operation and when the valve 33 is in the full-line position of Fig. 1. The valve 33 is pivoted to the shelf 17, as at 34, and has a curved upwardly extending portion 35 and a downwardly extending portion 36 which is weighted as at 37. The weights normally hold the valve in the full-line position of Fig. 1 to close the outlet opening 38 between the chambers 29 and 30. When the blower is in operation, however, the force of the blower overcomes the weights 37, and the blower also creates a suction in the chamber 30 by drawing air through the opening 32, thereby causing the valve to move to the dot-and-dash line position of Fig. 1 to open communication between the channels 29 and 30 and simultaneously shut off communication between the by-pass opening 32 and the channel 30. After the valve 33 has been fully moved to the dot-and-dash line position there is a suction below the valve 33 tending to hold it in the dot-and-dash line position as long as the blower is in operation.

At the lower end of the channel 29 is a fixed air guiding plate 39 which is curved similarly to the curvature of the valve portion 35. Thus when the valve is in the dot-and-dash line position the air is guided in a semi-circular path by the plate 29 and concave surface of the valve portion 35. Thus the air is guided in a smooth uniformly curved path at the return bend to minimize losses due to friction.

The inner casing 14 has a shelf 40 spaced above its bottom 15 by supporting legs 41. A small blower 42 communicates with the space below the shelf 40, and air from the blower may travel through an opening 43 in the shelf to aid in supporting combustion.

Mounted on top of the shelf is a pan 44 of a pot-type oil burner. The pan has a bottom oil space 45 separated by a ring 46 from the upper portion of the pan. The upper portion of the pan has its sides apertured, as at 47, so that air from the blower 42 may readily enter the upper portion of the pan. The pan is also provided with a ring-shaped cover 48 having a central opening 49.

The door 12 of the furnace is of such size that when it is open the cover 48 may be withdrawn through the door, providing the cover is held in vertical position. This allows access to the burner pan for the purpose of removing carbon there-from without removing the pan itself from the furnace.

The bottom portion 45 of the pan is supplied with oil from an inlet pipe 50, and the inlet pipe connects by a T 51 with a pipe 52 leading to an automatic thermostatic oil control 53. This control is of a type having a metering valve which either permits a very small amount of oil, sufficient to maintain the burner on "low fire," to be dripped into the burner pan, or a larger amount of oil, sufficient to maintain the burner at "high fire." This type of control is well-known and can be purchased on the open market, and therefore will not be described in any further detail.

Near the upper end of the inner casing 14 is a shelf 54 supporting a dome element 55. The dome element 55 comprises an inner cylinder 56 and a ring-shaped member 57. The inner cylinder has its lower end extending through an opening in the shelf 54 and has its upper end spaced below a refractory top 58. The refractory top closes the top of the ring 57. The ring 57 is spaced from the inner cylinder 56 by inwardly projecting radial fins 59 and is also spaced from the shelf 54 and from the walls of the casing 14 by outwardly projecting radial fins 60. There is thus formed a passageway extending through the cylinder 56, an annular passageway 61 surrounding the cylinder 56, and an annular passageway 62 surrounding the ring 57. In the form of the invention shown in Fig. 1, the ring 57 may be hollow to form a water heating element. It is therefore provided with inlet and outlet pipes 63 and 64 leading to and from a storage tank for domestic water.

Referring to Fig. 1, it is thus apparent that hot gases rising from the burner pan 44 heat air in the space 23 and then pass into the cylinder 56. When the gases emerge from the top of the cylinder 56 they strike the refractory top 58 and are directed downwardly, as indicated by the arrows, through the annular space 61 and then upwardly again through the space 62 and ultimately out through the pipe 65 leading to the chimney. As these hot gases pass around the water heating element 57 the domestic water is efficiently heated, and before the gases enter the chimney they again wipe the sides of the casing 14 to additionally heat the air in the surrounding space 23.

Figure 3:
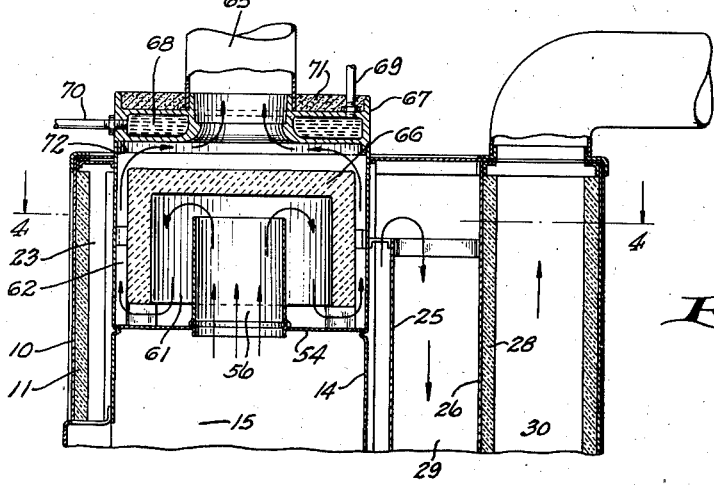
Fig. 3 is a fragmentary vertical sectional view of the upper portion of the furnace only, illustrating an alternative arrangement.
Figure 4:
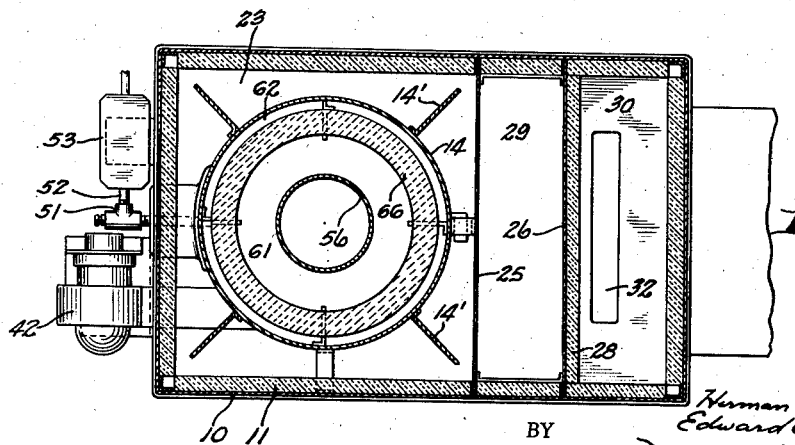
Fig. 4 is a transverse sectional view taken on line 4—4 of Fig. 3.

The domestic water heating arrangement shown in Fig. 1 is suitable for use in climates where the burner is not at high fire during continuous periods in the winter. In cold climates where the burner is at high fire for long periods of time, in order to prevent overheating of the domestic water, the arrangement shown in Fig. 3 is preferred. Referring to this figure, there is an inverted cup-shaped dome member 66 formed of refractory material which takes the place of the ring 57 and refractory top 58 of the form of the invention of Fig. 1. This cap provides for the same circuitous course of travel through the inner cylinder 56, annular space 61, and annular space 62. The purpose of this arrangement is to lengthen the flue gas travel to better mix the products of combustion and increase combustion efficiency by providing secondary combustion. By thus lengthening the flue gas travel through the dome member 66, or through the corresponding arrangement of Fig. 1, the height of the furnace may be reduced. Thus the entire installation may be more compact and it is more suitable for use in small homes where head room is often at a premium.

In the arrangement of Fig. 3 there is a circular cap member 67, containing a chamber 68 for water to be heated. The chamber connects by means of pipes 69 and 70 with the domestic water storage tank. On top of the member 67 is asbestos or other insulating material 71. The water heating cap member 67 has a depending annular flange 72, which fits within the upper end of the inner casing 14 to maintain the member 67 in position. With this arrangement the flue gases are brought against the side walls of the combustion chamber in the annular space 62 before any heat is delivered to the domestic water. Then the flue gases pass, as indicated by the arrows, to wipe the entire lower and inner side surfaces of the receptacle 68 before passing into the chimney pipe. This arrangement provides for ample hot water without danger of overheating the latter.

Figure 5:
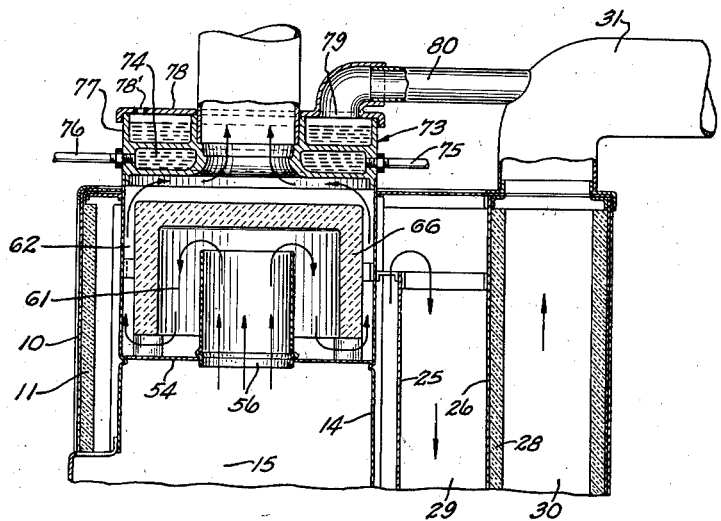
Figs. 5 and 6 are views similar to Fig. 3 showing alternative caps installed on the upper end of the furnace.

In the arrangement shown in Fig. 5, an alternative form of cap is inserted in lieu of the cap 67. This cap, designated by the numeral 73, contains a chamber 74 for domestic water, having inlet and outlet pipes 75 and 76 leading to a domestic water storage tank, and in addition there is a humidifier pan 77 above the water heating chamber. The humidifier pan 77 has a cover 78 formed with an air opening 78' and also formed with an opening 79, which communicates through a pipe 80 with the air delivery duct 31 leading to the rooms. Thus if the humidifier pan 77 is kept filled with water the heat of the rising flue gases will cause evaporation of the water, and these vapors will furnish a desired amount of humidity to the hot air being conducted to the rooms.

Figure 6:
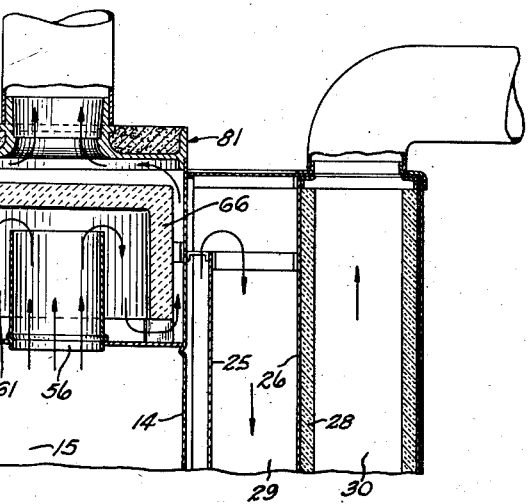

For a less expensive installation, where no domestic hot water heating or humidification is desired, a plain cap member 81 may be employed instead of the caps 67 and 73. This arrangement is illustrated in Fig. 6. The upper portion of the cap is formed with a circular flange for the reception of asbestos 82 or other insulating material, or if humidification is desired, the flange may enclose water and be equipped the same way as the humidifier pan 77 of Fig. 5. Another alternative cap member may also be kept in stock which can be the same as Fig. 5 without the domestic water heating chamber 74. In this case the cap member will provide for humidification only. Thus the same furnace may be readily varied to suit particular requirements.

In all forms of the invention the hot water storage tank is preferably equipped with an aquastat so wired to the automatic control 53 of the oil burner as to cause the burner to operate at high fire when the water in the storage tank calls for additional heat, and to cause the burner to operate at low fire when a proper degree of heat is present in the storage tank. The automatic control 53 for the oil burner is also electrically connected with a room thermostat, suitably located in the space to be heated, so that the burner will operate at high fire when the space calls for additional heat and at low fire when additional heat is not needed either in the rooms or in the water storage tank. The blower 42, which furnishes air to support combustion, is automatically operated whenever the burner is at high fire. The motor 21 for the main blower 20 may be suitably controlled through a thermostat located in the top of the furnace. Thus after the oil burner has been operating at high fire for a sufficient length of time to build up the temperature in the furnace dome, then the blower 20 will automatically operate to forcibly propel hot air through the house distribution ducts. These controls are all well-known and have therefore not been illustrated.

The operation of all forms of the invention is substantially the same, and reference is therefore made to Fig. 1. When the blower 20 is operating, cold air will be withdrawn from the rooms through the return duct 19', will be forced upwardly through the air heating space 23 to the top of the cabinet, downwardly through the channel 29, and upwardly through the channel 30 to the rooms. The operation of the blower has, as heretofore described, forced the valve 33 to the dot-and-dash line position of Fig. 1. When the blower is not operating, the weights 37 on the lower end of the valve 33 swing the valve to the full-line closed position of Fig. 1. This immediately prevents escape of heat from the channel 29 to the rooms. It also permits air from the return pipe 19' to circulate as indicated by the arrows "A" through the by-pass opening 32 directly into the insulated channel 30. Thus the air distribution system is put in balance and there can be no siphoning of hot air from the furnace if hot air is not desired in the rooms and when the oil burner is operating for the purpose of heating domestic water only. This permits use of the apparatus in summer for the purpose of heating water alone. When so operating the valve 33 is always in the full-line closed position of Fig. 1 and the burner is operating a majority of the time on low fire. It is only when considerable water is withdrawn from the storage tank that the aquastat will call for high fire, and therefore the heating of water in the summer is very economical and there is no undesired heating of the rooms. In order to eliminate any possibility of the fan switch in the dome of the furnace turning on the blower 20 in summer, a master switch for the blower may be provided, which will eliminate any possibility of the blower operating and causing opening of the valve 33.

The construction is very simple and inexpensive, and the use of the pot-type burner in this particular combination permits low cost heating of domestic water in summer. The particular arrangement of the blower with respect to the return duct and by-pass opening 32 is also important because there is no interference with circulation of air by gravity through the house distribution system when the blower is not in operation. It is also to be noted that due to the arrangement of the channels 29 and 30, together with the position of the by-pass opening 32, that a single automatically operated valve may be employed to simultaneously control the opening 38 and the by-pass opening 32.

Various changes and modifications may be made without departing from the spirit of the invention, and all of such changes are contemplated as may come within the scope of the claims.

What we claim is:

1. In a hot air heating apparatus having a combustion chamber and having an air heating space adjacent said combustion chamber formed with an inlet, there being an outlet duct extending downwardly from the upper portion of the air heating space and having an outlet opening at its lower end, an upwardly extending discharge duct communicating adjacent its lower end with said outlet opening, a return duct having a portion positioned below the lower ends of said outlet and discharge ducts and connected to the air heating space inlet, there being a by-pass opening between said return duct portion and the discharge duct located in advance of said air heating space inlet to intercept air from the return duct before said air has traveled to the air heating space inlet, and a valve positioned adjacent said by-pass opening and outlet opening and of a size to close either opening and mounted for movement from closing position with respect to one opening to closing position with respect to the other opening.

2. In a hot air heating apparatus having a combustion chamber and having an air heating space adjacent said combustion chamber formed with an inlet, there being an outlet duct extending downwardly from the upper portion of the air heating space and having an outlet opening in a substantially vertical side wall adjacent its lower end, an upwardly extending discharge duct communicating through a side near its lower end with said outlet opening, a return duct having a portion positioned below the lower ends of said outlet and discharge ducts and connected to the air heating space inlet, there being a by-pass opening between said return duct portion and the discharge duct located in a substantially horizontal wall portion at the bottom of the discharge duct in advance of said air heating space inlet to intercept air from the return duct before said air has traveled to the air heating space inlet, and a valve positioned adjacent said by-pass opening and outlet opening and of a size to close either opening and mounted for movement from closing position with respect to one opening to closing position with respect to the other opening, said valve having a concave surface portion so disposed in an oblique position when the valve is in by-pass closing position that one edge of the valve is located adjacent the outlet opening substantially at the bottom of said opening and the opposite edge of the valve is disposed adjacent the wall of the discharge duct which is remote from said outlet opeing and is at a higher elevation than said first edge so as to connect the lower end of the outlet duct with the interior of an opposite side of the discharge duct to direct air upwardly into the discharge duct when the valve is in by-pass closing position.

3. In a hot air heating apparatus having a combustion chamber and having an air heating space adjacent said combustion chamber formed with an inlet, there being an outlet duct extending downwardly from the upper portion of the air heating space and having an outlet opening in a substantially vertical side wall near its lower end, an upwardly extending discharge duct communicating through a side near its lower end with said outlet opening, a return duct having a portion positioned below the lower ends of said outlet and discharge ducts and connected to the air heating space inlet, there being a by-pass opening between said return duct portion and the discharge duct located in a substantially horizontal wall portion at the bottom of the discharge duct in advance of said air heating space inlet to intercept air from the return duct before said air has traveled to the air heating space inlet, and a valve positioned adjacent said by-pass opening and outlet opening and of a size to close either opening and mounted for movement from closing position with respect to one opening to closing position with respect to the other opening, said valve having a concave surface portion so disposed in an oblique position when the valve is in by-pass closing position that one edge of the valve is located adjacent the outlet opening substantially at the bottom of said opening and the opposite edge of the valve is disposed adjacent the wall of the discharge duct which is remote from said outlet opening and is at a higher elevation than said first edge so as to connect the lower end of the outlet duct with the interior of an opposite side of the discharge duct to direct air upwardly into the discharge duct when the valve is in by-pass closing position, the outlet duct having a concave bottom portion which curves upwardly from the adjacent edge of the valve toward the opposite side wall of the outlet duct to supplement the curved surface portion of the valve in forming a common concave air reversing bottom for the outlet duct and discharge duct.

4. In a hot air heating apparatus, an outer upright casing, an inner upright casing forming a furnace positioned in said outer casing, there being a vertical air heating space between said inner and outer casings having a bottom inlet, a main vertical partition in the outer casing dividing the casing into two chambers, one containing the furnace and the other being an air-directing chamber separated from the furnace, an auxiliary partition in the air-directing chamber separating the latter into a downwardly extending air outlet channel, there being communication between the upper end of the outlet channel and the air heating space, and an upwardly extending air discharge channel, said two channels having a communicating opening at their lower ends, a transverse air return duct below the furnace and below the air-directing chamber and connected to the air heating space inlet and having a by-pass opening communicating with the air discharge channel and located in advance of the air heating space inlet to intercept air from the return chamber before said air has traveled to the air heating space inlet, and means positioned to cooperate with said channel opening and with said by-pass opening and including a movable valve positioned in the lower end of the air-directing chamber, which is of a size to shut off communication between the air outlet channel and air discharge channel.

5. In a hot air heating apparatus, an outer upright casing, an inner upright casing forming a furnace positioned in said outer casing, there being a vertical air heating space between said inner and outer casing having a bottom inlet, a main vertical partition in the outer casing dividing the casing into two chambers, one containing the furnace and the other being an air-directing chamber separated from the furnace, an auxiliary partition in the air-directing chamber separating the latter into a downwardly extending air outlet channel, there being communication between the upper end of the outlet channel and the air heating space, and an upwardly extending air discharge channel, said two channels having a communicating opening at their lower ends, a transverse air return duct below the furnace and below the air-directing chamber connected to the air heating space inlet and having a by-pass opening located in advance of the air heating space inlet and communicating with the air discharge channel, and a valve positioned in the bottom of the air-directing chamber and of a size to close either the channel opening or the by-pass opening and mounted for movement from closing position with respect to one opening to closing position with respect to the other opening.

6. In a hot air heating apparatus, an outer upright casing, an inner upright casing forming a furnace positioned in said outer casing, there being a vertical air heating space between said inner and outer casing having a bottom inlet, a main vertical partition in the outer casing dividing the casing into two chambers, one containing the furnace and the other being an air-directing chamber separated from the furnace, an auxiliary partition in the air-directing chamber separating the latter into a downwardly extending air outlet channel, there being communication between the upper end of the outlet channel and the air heating space, and an upwardly extending air discharge channel, said two channels having a communicating opening at their lower ends, a transverse air return duct below the furnace and below the air-directing chamber connected to the air heating space inlet and having a by-pass opening located in advance of the air heating space inlet and communicating with the air discharge channel, and a valve positioned in the bottom of the air-directing chamber and of a size to close either the channel opening or the by-pass opening and mounted for movement from closing position with respect to one opening to closing position with respect to the other opening, said valve having a counterweight normally maintaining it in by-pass opening position, and a blower in the air return chamber having its outlet connected to the air heating space inlet, said blower having sufficient strength to move the valve to by-pass closing position when the blower is in operation.

7. In a hot air heating apparatus having a combustion chamber, having an air heating space adjacent said combustion chamber and formed with an inlet and an outlet, a discharge duct for leading hot air from the air heating space outlet to the portion of the building to be heated, a return duct having a portion positioned adjacent said discharge duct and connected to the air heating space inlet, a blower having its outlet connected to the air heating space inlet and having its inlet communicating with the air return duct, there being a by-pass opening between said return duct portion and the discharge duct located in advance of said blower, a valve positioned in said discharge duct adjacent the air heating space outlet and adjacent said by-pass opening and of a size to close either said outlet or by-pass opening and mounted for movement from closing position with respect to the outlet opening to closing position with respect to the by-pass opening, and a counterweight normally maintaining the valve in by-pass opening position, said blower having sufficient strength to move the valve to by-pass closing position when the blower is in operation.

8. In a hot air heating apparatus having a combustion chamber, having an air heating space adjacent said combustion chamber and formed with an inlet and an outlet, a discharge duct for leading hot air from the air heating space outlet to the portion of the building to be heated, a return duct having a portion positioned adjacent said discharge duct and connected to the air heating space inlet, a blower having its outlet connected to the air heating space inlet and having its inlet communicating with the air return duct, there being a by-pass opening between said return duct portion and the discharge duct located in advance of said blower, a valve positioned in said discharge duct adjacent the air heating space outlet and adjacent said by-pass opening and of a size to close either said outlet or by-pass opening and mounted for movement from closing position with respect to the outlet opening to closing position with respect to the by-pass opening, and means normally maintaining the valve in by-pass opening position, said blower having sufficient strength to overcome said means and move the valve to by-pass closing position when the blower is in operation.

9. In a hot air heating apparatus having a combustion chamber, having an air heating space adjacent said combustion chamber and formed with an inlet and an outlet, a discharge duct for leading hot air from the air heating space outlet to the portion of the building to be heated, a return duct having a portion positioned adjacent said discharge duct and connected to the air heating space inlet, a blower having its outlet connected to the air heating space inlet and having its inlet communicating with the air return duct, there being a by-pass opening between said return duct portion and the discharge duct located in advance of said blower, a valve positioned in said discharge duct adjacent the air heating space outlet and adjacent said by-pass opening and of a size to close either said outlet or by-pass opening and mounted for movement from closing position with respect to the outlet opening to closing position with respect to the by-pass opening, and means maintaining the valve in by-pass opening position only when the blower is not in operation.

HERMAN C. FRENTZEL, JR.
EDWARD O. ERRATH.

REFERENCES CITED

The following references are of record in the file of this patent:

UNITED STATES PATENTS

| Number | Name | Date |
|---|---|---|
| 1,363,555 | Beattie | Dec. 28, 1920 |
| 1,452,249 | Miller | Apr. 17, 1923 |
| 2,043,387 | Norris | June 9, 1936 |
| 1,694,392 | Miller | Dec. 11, 1928 |
| 1,765,439 | Miller | June 24, 1930 |
| 516,061 | Norton | Mar. 6, 1894 |
| 1,680,166 | Moss | Aug. 7, 1928 |
| 1,692,816 | Chamberlin | Nov. 27, 1928 |
| 1,862,985 | Sandwick | June 14, 1932 |
| 923,404 | Burger | June 1, 1909 |
| 649,502 | Wills | May 15, 1900 |
| 2,172,667 | Nelson | Sept. 12, 1939 |
| 1,641,869 | Severson | Sept. 6, 1927 |
| 917,756 | Elliott | Apr. 13, 1909 |
| 1,440,867 | Ellison | Jan. 2, 1923 |
| 1,688,363 | Teare | Oct. 23, 1928 |
| 2,193,735 | Mueller | Mar. 12, 1940 |